Figure 1:
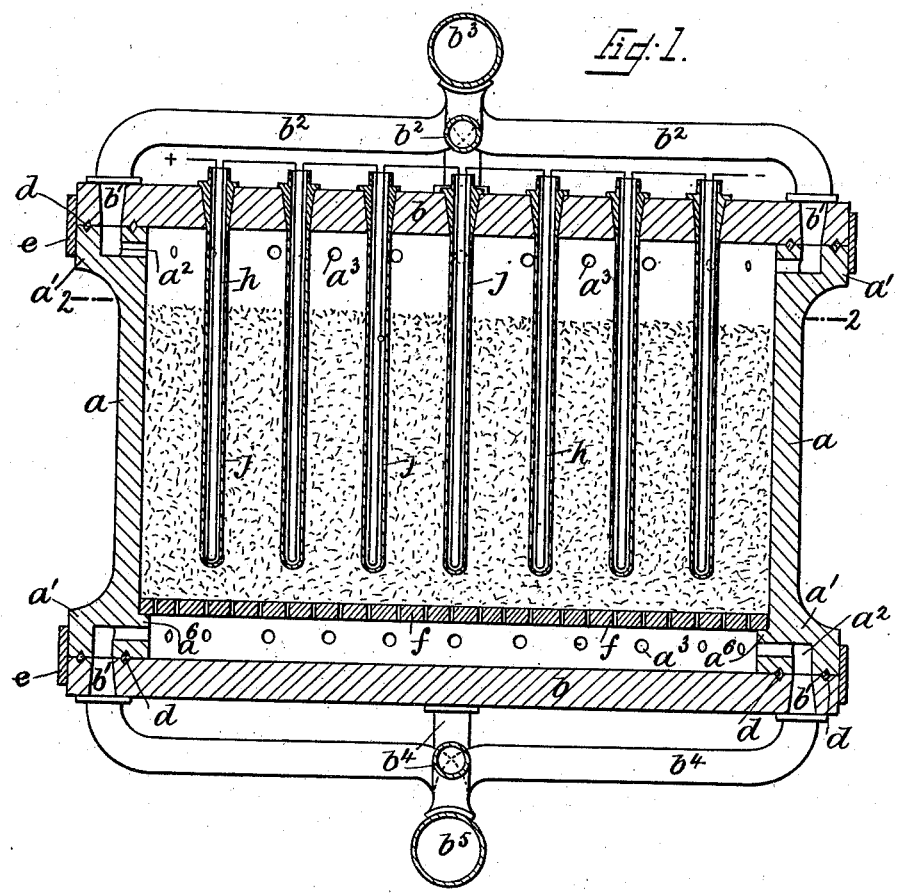

No. 654,466. Patented July 24, 1900.
J. MACTEAR.
PROCESS OF MAKING CYANIDS.
(Application filed Sept. 16, 1899.)
(No Model.)

Witnesses:
Thos. Kilpatrick
Geo. P. W. Lindsey

Inventor
James Mactear
by Alexander & Co
Attorneys

THE NORRIS PETERS CO., PHOTO-LITHO., WASHINGTON, D. C.

UNITED STATES PATENT OFFICE.

JAMES MACTEAR, OF LONDON, ENGLAND.

PROCESS OF MAKING CYANIDS.

SPECIFICATION forming part of Letters Patent No. 654,466, dated July 24, 1900.

Application filed September 16, 1899. Serial No. 730,701. (No specimens.)

*To all whom it may concern:*

Be it known that I, JAMES MACTEAR, a subject of the Queen of Great Britain and Ireland, and a resident of 28 Victoria street, London, England, have invented certain new and useful Improvements in the Obtainment of Cyanogen Compounds, (for which I have filed an application for British Patent No. 5,037, dated March 7, 1899,) of which the following is a specification.

This invention relates to the production of ammonium cyanide and of alkaline cyanides at a reduced cost and without the production of useless by-products, and to this end is characterized by the production of ammonium cyanide by decomposing a mixture of gaseous ammonia and gaseous carbonic oxide (mixed, if pure, in the respective proportions of about two volumes of the former and one volume of the latter, preferably with the former slightly in excess) in a chamber charged with wood-charcoal and heated internally and uniformly throughout by electric resistances, and if alkaline cyanides are required by leading the ammonium cyanide and water constituting the products of the reaction in the decomposing-chamber from the chamber and after being cooled into absorption vessels containing appropriate alkaline hydrates in solution in water or alcohol—such as caustic soda, if sodium cyanide is required, or caustic potash, if potassium cyanide is required, or a mixture of such hydrates if a mixture of such cyanides is required, with the consequent formation of the required cyanide or cyanide mixture and liberation from the ammonium cyanide of the ammonia, which latter may be recovered and may again be used in the cycle of operations, the alkaline cyanide or cyanide mixture being obtained by evaporating the solution, preferably *in vacuo.*

Where owing to cheapness of the electric current or to other favorable conditions the volume of the gases to be dealt with is not of material importance, an impure gaseous carbonic oxide—such as may be obtained by the limited combustion of carbonaceous matter with air or with air and steam, such as "producer-gas or "Dowson gas," and in which the carbonic oxide will be mixed with nitrogen or with nitrogen and hydrogen—may be used in mixture with the gaseous ammonia in the obtainment of the ammonium cyanide.

The heating of the decomposing-chamber internally by the employment of electric resistances enables the chamber to be made of such internal dimensions as allow of the process being carried out on a commercial scale, while also insuring that uniformity of a sufficiently-high temperature throughout the chamber, which is so essential a requirement to the obtainment of the required product in a sufficiently economical way to be commercially practicable.

Figure 2:
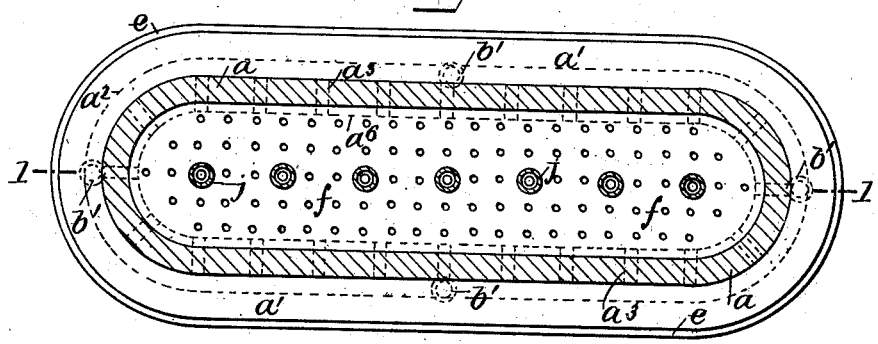

The accompanying drawings represent an electrical furnace suitable for use in the obtainment of the ammonium cyanide and for which I am applying for United States patent under application Serial No. 732,510, Figure 1 representing the same in sectional elevation on the line 1 1, Fig. 2, and Fig. 2 representing the same in sectional plan on the line 2 2, Fig. 1, but not showing the catalytic substance.

$a$ represents a vertically-arranged chamber made of porcelain or other suitable refractory material and formed of an oblong shape, Fig. 2, with open ends and flanged extensions $a'$, the end faces of which are each formed with a surrounding annular channel $a^2$, which communicates with the interior of the chamber by lateral perforations $a^3$. The chamber ends are closed by covers $b$, each of which is formed with through-openings $b'$, adapted to communicate with the adjacent channels $a^2$ of the chamber. The openings $b'$ at the inlet end of the chamber communicate by branched piping $b^2$ with a main $b^3$, leading from the mixing-chamber of the gases to be decomposed, and the openings $b'$ at the outlet end of the chamber communicate by branched piping $b^4$ with a main $b^5$, by which the products of the reaction of the gases in the chamber are led to the absorption vessels, wherein the ammonium cyanide is converted into the required alkaline cyanide. The chamber ends and its end covers are luted together at $d$ by a suitable cement and are also bound together by metal bands $e$. The bottom end of the chamber is made with an inner ledge $a^6$, serving to support a perforated false bottom $f$, by which the wood-charcoal $g$ is supported. The chamber is heated internally by a series of electrical resistances $h$, preferably in the form of coils of platinum wire wound upon a support of refractory material mounted in a tube $j$, of refractory material, passing into or through the chamber, the resistances being connected in series or otherwise with a dynamo or other source of electric energy by means of which their temperature can be raised to such a point as will give the required equal temperature in the spaces between the adjacent tubes $j$ and also in those between each thereof and the adjacent sides of the chamber, whereby the desired equable temperature of the whole interior of the decomposing-chamber is effectually obtained.

What I claim as my invention, and desire to secure by Letters Patent, is—

1. The production of ammonium cyanide by the decomposition of a gaseous mixture of ammonia and carbonic oxide in a chamber charged with wood-charcoal and heated internally and uniformly throughout by electrical resistances, as set forth.

2. The production of alkaline cyanides by the production of ammonium cyanide by the decomposition of a gaseous mixture of ammonia and carbonic oxide in a chamber charged with wood-charcoal and heated internally and uniformly throughout by electrical resistances, the conversion of the ammonium cyanide into the required alkaline cyanide by the action of a corresponding alkaline hydrate in solution in water or alcohol with liberation from the ammonium cyanide of the ammonia, and the obtainment of the required cyanide by the evaporation of the solution, as set forth.

Signed at London, England, this 10th day of August, 1899.

JAMES MACTEAR.

Witnesses:
CHARLES AUBREY DAY,
ALFRED CHARLES DAY.